(12) United States Patent
Vaeth

(10) Patent No.: US 10,086,802 B2
(45) Date of Patent: Oct. 2, 2018

(54) VEHICLE SNOW REMOVAL DEVICE AND METHOD OF USE

(71) Applicant: Michael Scott Vaeth, Stony Brook, NY (US)

(72) Inventor: Michael Scott Vaeth, Stony Brook, NY (US)

(*) Notice: Subject to any disclaimer, the term of this patent is extended or adjusted under 35 U.S.C. 154(b) by 0 days.

(21) Appl. No.: 15/395,735

(22) Filed: Dec. 30, 2016

(65) Prior Publication Data
US 2017/0240143 A1   Aug. 24, 2017

Related U.S. Application Data

(60) Provisional application No. 62/297,594, filed on Feb. 19, 2016.

(51) Int. Cl.
| | | |
|---|---|---|
| *B60S 3/04* | (2006.01) | |
| *E01H 5/02* | (2006.01) | |
| *B08B 1/00* | (2006.01) | |
| *B08B 13/00* | (2006.01) | |

(52) U.S. Cl.
CPC ............. *B60S 3/045* (2013.01); *E01H 5/02* (2013.01); *B08B 1/00* (2013.01)

(58) Field of Classification Search
CPC .. A01B 1/02; E01H 5/02; B08B 1/005; B60S 3/045
See application file for complete search history.

(56) References Cited

U.S. PATENT DOCUMENTS

| | | | | |
|---|---|---|---|---|
| 2,639,454 A | * | 5/1953 | Dory | ......................... A47L 1/16 15/145 |
| 5,630,633 A | * | 5/1997 | Dupre | .................... A01B 1/222 294/53.5 |
| 5,694,695 A | | 12/1997 | Lund | |
| 6,435,580 B1 | * | 8/2002 | Lock | ......................... E01H 5/02 294/54.5 |
| 2003/0146632 A1 | * | 8/2003 | Marion | ................... B60S 3/045 294/51 |

OTHER PUBLICATIONS

Garant® Nordic® 24in Aluminum Snow Shovel (NAP24DR)—Dec. 2016, 1 page http://www.acehardware.com/product/indexjsp?productId=4480759.
The SnowPlow Pusher—36in.W, Model#50536—Dec. 2016, 1 page http://www/northerntool.com/shop/tools/product_200617793_200617793.
Action Tools Swivel Snow Shovel—ACTSSS1—Dec. 2016, 1 page http://www.lowesca/snow-removal/action-tools-swivel-snowshevel_g1608399.hmtl.
Suncast SP2725 27-Inch Snow Shovel/Pusher and D-Grip Handle, Navy (UPC 044365007410)—Dec. 2016, 1 page https://www.thriftcat.org/upc/044365007410/suncast-sp2725-27inch-snow-shovelpusher.
Poly Scraper Heavy Duty Snow Shovel With Steel D Grip Handle, Dec. 2016, 1 page http://www.amleo.com/poly-scraper-heavy-duty-snow-shovel-with-steel-d-grip-handle/p/1024PS/.

* cited by examiner

*Primary Examiner* — Mikhail Kornakov
*Assistant Examiner* — Natasha N Campbell
(74) *Attorney, Agent, or Firm* — Winston & Strawn LLP

(57) ABSTRACT

A vehicle snow removal device is disclosed. With the new product being made of rigid material, and having a closed sided, concave shape, the vehicle can be easily cleaned. With the long handle member provided, the user does not get their hands in the snow and can remove snow from entire surface area of the vehicle.

16 Claims, 3 Drawing Sheets

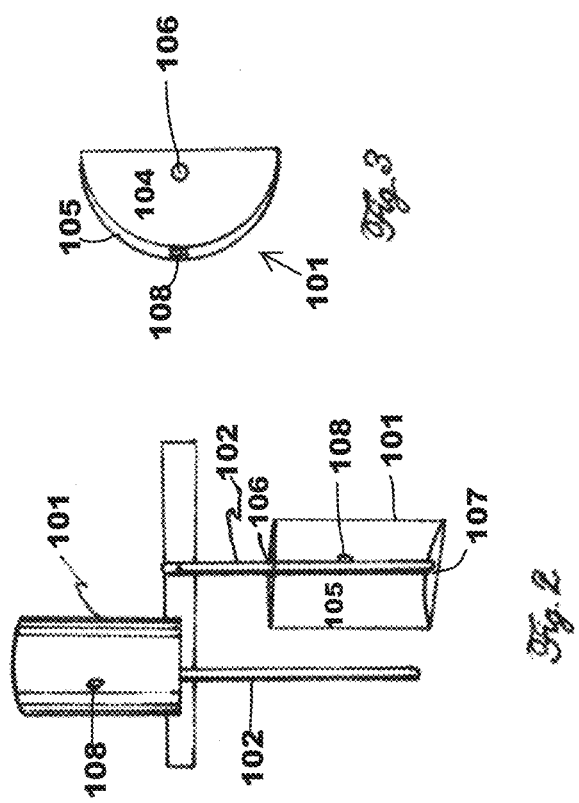

VEHICLE SNOW REMOVAL DEVICE AND METHOD OF USE

The benefit of application 62/297,594 filed Feb. 19, 2016 is claimed herein and the entire content of that application is expressly incorporated herein by reference thereto.

BACKGROUND OF THE INVENTION

The primary function of a snow shovel is to remove snow from the walkway and driveway. There have been many different shapes and sizes developed in order to achieve this goal. There have also been separate tools designed to remove snow from vehicles. These include snow brooms, brushes and scrapers. These tools have been developed in a way which encourages the user to store them in the trunk of the vehicle until needed for use.

With these options, the user would use a shovel or snow blower to clear the walkways and driveway to gain access to their vehicle. Now the user is confronted with the situation that they must reach through the snow and attempt to open the trunk to retrieve their snow broom, brushes or ice scraper. This inevitably leads to an avalanche—cold hands and snow falling into the trunk. Also, these tools are too small and weak to remove large amounts of snow from the vehicle.

Using ice scrapers to clear large accumulations of snow results in user inevitably getting snow up his or her sleeves and having their hands freeze as a result. Attempting to get in the trunk or cab, when it is covered in snow, usually results in snow falling into the vehicle. In the desperation to get the bulk of snow off the vehicle, many people attempt using snow shovels to carefully remove snow without scratching the paint. However, most shovels are either made of metal or have a metal edge along their base which would inevitably cause scratching or other damage to vehicle.

Accordingly, there is a need for better snow removal devices for use in such situations and these are now provided by the present invention.

SUMMARY OF THE INVENTION

The new snow removal device is made of rigid material, and has a closed sided, concave shape, so that the vehicle can be easily cleaned. With a long handle, user does not get their hands in the snow, and can remove snow from the entire surface area of the vehicle. Also, the use of a plastic material for the parts that contact the vehicle avoids scratching or other damage.

Accordingly, the snow removal device of the present invention comprises a device for removing snow from an automobile vehicle comprising a plow member having a sidewall, end portions forming with the sidewall an open cavity for contact with or removal of snow accumulated on the vehicle, the plow member made of a resilient, durable plastic or elastomeric material; a handle member that is securely connected to the plow member to allow manipulation of the plow member, the handle member having a length sufficient to contact and remove snow from the vehicle's roof, front window, hood and/or trunk without the user's hand or arm touching the snow on the vehicle; and a first reinforced aperture in the plow member sidewall for receiving and connecting thereto an end of the handle member so that the plow member can be manipulated to allow the user to remove snow from the vehicle's roof, front window, hood and/or trunk without causing scratches or damage to glass or painted surfaces.

The plow member advantageously has a half cylinder or open polygonal configuration and a length of about 6 to 24 inches and typically about 12 to 18 inches wherein the handle member is a solid or hollow rod having a length of between 12 and 72 inches and typically about 36 to 60 inches. In one embodiment, the handle member is telescopic so that it can be collapsed to a length that is less than the overall length for compact storage.

The plow member preferably has a half cylindrical configuration, and wherein each end portion is an segment of approximately 180 degrees in diameter and which includes an opening to receive the handle member therein. The handle member is removable from the reinforced aperture of the plow member and to then be received in the end portion opening for compact storage. For this, the opening on one end portion of the plow member is larger than the circumference of the handle member while the opening on the other end portion of the plow member includes internal threads for receiving the threaded end of the handle member.

The first reinforced aperture preferably includes internal threads for receiving a threaded end of the handle member and is located in the center of the sidewall so that approximately the same amount of sidewall extends above and below the opening. Other variations of this connection are disclosed in the detailed description.

Another embodiment of the invention relates to a method of removing snow from a vehicle which comprises retrieving one of the devices disclosed herein from storage; attaching an end of the handle member into the aperture on the plow member sidewall to place the device in an operable position; and removing snow from the vehicle while sliding the plow member over vehicle surfaces to remove accumulated snow therefrom without scratching or damaging vehicle surfaces and without the user contacting the snow on the vehicle. The device may be returned to storage after the snow is removed by withdrawing the handle member from the aperture of the plow member sidewall; and storing the collapsed device on a support rail. This is facilitated by the use of a handle member having a threaded end as the handle member is simply withdrawn from the threaded aperture of the plow member sidewall and the is inserted through the relatively larger opening on one end portion and attached to the aperture in the other end portion to form a collapsed device for storage on a support rail.

Other features of the invention are disclosed in the appended drawings as explained by the detailed description that follows.

BRIEF DESCRIPTION OF THE DRAWING FIGURES

Preferred embodiments of the invention are now described with reference to the appended drawing figures, wherein:

FIG. 1 is an illustrative representation of a rigid form to make a plow member shape with handle member applied.

FIG. 2 is an illustrative representation of a snow removal device hanging in storage.

FIG. 3 is an illustrative representation of a snow removal device in section.

DETAILED DESCRIPTION OF THE INVENTION

Figure 4:
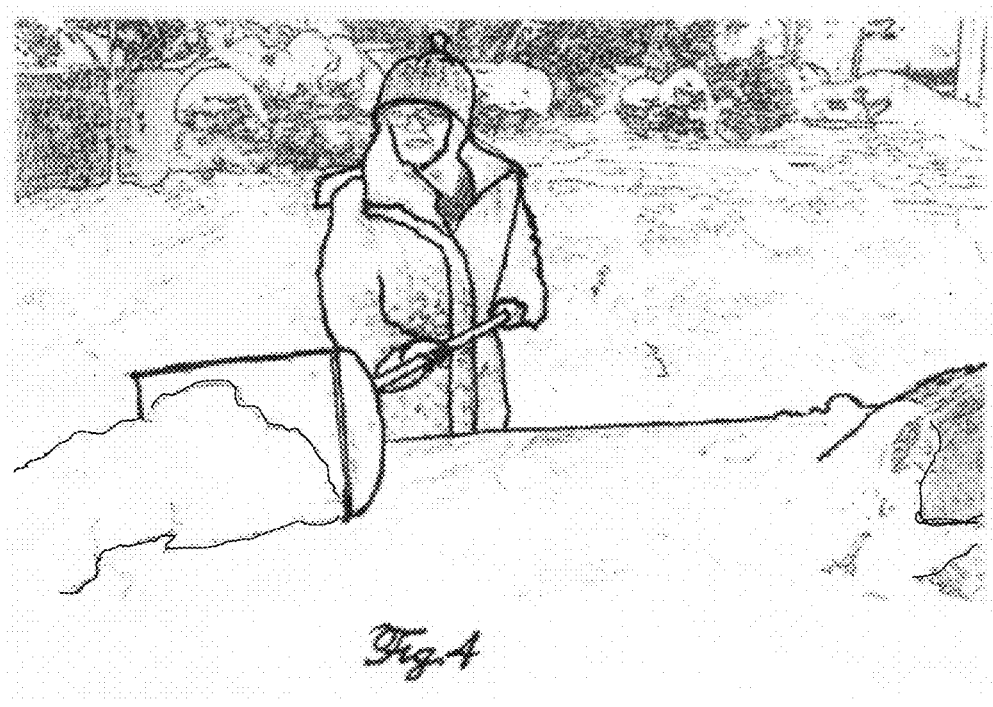
FIG. 4 is an illustrative representation of a snow removal from vehicle.

The device of the present invention is stored with other snow removal tools-in garage, front porch or mud room.

After clearing a path to the vehicle using shovels or a snow blower, the concept is to quickly assemble the device, by unscrewing the handle member from the storage position to the set position, then simply pushing the snow off the vehicle. This gives user access to other cleaning tools stored inside the trunk as well as the ability to warm up the vehicle to further remove snow and ice.

The claimed invention differs significantly from what currently exists. Although there are many products on the market used for snow removal from vehicles, they are designed to be stored inside the trunk or cab of the vehicle. This limits the size and scope of the tools used. As noted, conventional ice and snow scrapers are small and can only remove small amounts of snow. Additional tools have been created which can push snow from the vehicle, but because of limitations of size and materials used, they are ineffective. The invention is of more substantial size and strength as it does not need to fit into the trunk. This allows user to remove larger accumulations of snow from the vehicle before having to gain access to the trunk or cab where the smaller devices may be located for finer cleaning of snow from the vehicle.

A wide range of plastic or polymeric materials can be used for the plow member or if desired for both the plow member and the handle member. Preferred materials include acrylonitrile butadiene styrene; polyacrylonitrile; polyamide; polyethylene, polypropylene; polyvinyl chloride; and polyvinylidene chloride. The preferred materials are those that are moldable, extrudable or otherwise formable into the desired size and shape. Materials that are weldable or capable of being adhered together with adhesives are preferred especially when the handle and plow members are to be attached to each other.

The plastic material may also be a thermosetting plastic material with preferred materials including epoxy, polyester or polyurethane formulations. These materials can be reinforced with conventional fibers or filler (carbon, glass, metal, etc.) if desired for additional strength so long as the filler does not impart surface roughness that may cause scratching.

The plow member may instead be made of an elastomeric material such as polyisoprene: cis-1,4-polyisoprene natural rubber and trans-1,4-polyisoprene gutta-percha; chloropene rubber; butyl rubber including halogenated butyl rubber; nitrile rubber; ethylene propylene diene rubber; and chlorosulfonated polyethylene.

The elastomeric materials disclosed herein can also be provided with conventional filler materials to increase weight and hardness. They also can be reinforced with fiberglass, other fibers, fabric or metal sheets, screening or scrim to reduce elongation and provide greater rigidity. As noted herein, the filler or other reinforcement muse be one that does not impart surface roughness that may cause scratching.

The materials for the plow member typically have a shore A hardness of between 60 and 80 and preferably 70 as this provides the best compromise of hardness that does not scratch or damage vehicle surfaces.

The handle member can be made of any of the foregoing plastic or elastomeric materials or it can be made of any type of wood or even of a lightweight metal tube.

With the invention being made of rigid plastic material, and having a closed sided, concave shape, the vehicle can be easily cleaned. With the long handle member that is provided, the user does not get their hands in the snow, and can remove snow from the entire surface area of the vehicle.

FIG. 1 is an illustrative representation of a snow removal device 100 having a rigid form that is shaped as a plow member 101 and that has a handle member 102 applied thereto. The handle member 102 typically is in the form of a cylindrical rod that has a diameter of about ⅞ inches and is preferably about 48 inches long. The diameter can vary from ½ to 1½ inches depending upon whether the rod is solid or hollow and the length of the handle member can vary from 12 to 72 inches. Plow member 101 is the part of the tool which contacts the snow. It is typically half of a closed cylinder that has a diameter of about 11 inches, with a length of about 12 to 18 inches and flat top 103 and bottom 104 walls along with the curved side wall 105 of the cylinder. Different sized cylinders ranging in diameter from 6 to 20 inches can be used, with lengths varying from 6 to 24 inches.

The device 100 has means for firmly attaching the handle member 102, typically in the form of an aperture that has screw threads for receiving the threaded end of the handle member 102. The aperture is preferably reinforced by being provided in a larger thickness than the sidewall, or with a support plate that is present inside the cavity of the plow member preferably by being adhered or otherwise attached thereto. Alternatively, the aperture can be a simple hole and the threaded end of the rod can be secured to the support plate or instead to a nut which contacts the plate during tightening to secure the handle member to the sidewall.

Having a threaded end allows the handle member to be removed from the plow member 101 for storage. In a particularly preferred arrangement, the top 103 and bottom 104 ends of the plow member 101 include apertures 106, 107, wherein aperture 106 is sized to receive the handle member 102 therein while aperture 107 is threaded to receive the threaded end of handle member 102. Alternatively, the nut that secures the threaded end of the handle member to the sidewall can be used to secure the threaded end in a smooth bore aperture 107 wherein the nut engages the outer side of the end portion. These arrangements enable the tool to be stored as shown in FIG. 2. The collapsible storage feature of the invention is not critical, however, and in other embodiments, the handle member is attached to the plow member by an adhesive, by a press fit, or by nailing, screws or rivets or non-removable lock nuts. When the handle member is made of the same plastic as the plow member, as noted, these components can be welded or adhered together.

In all embodiments, the handle member 102 is made of a rigid material which gets physically attached to plow member 101 at an angle appropriate to push the shovel head forward in order to successfully remove snow from vehicle. In one embodiment, the reinforced aperture of the plow member is located in the center of the sidewall, both from the end portions as well as the open sidewall edges. Alternatively, the reinforced aperture can be located up to ±60 degrees or even up to ±45 degrees from the center and preferably from ±5 to ±30 degrees from the center along the sidewall towards a sidewall edge to provide greater leverage to the user when pushing or lifting snow. Typically, the handle member is made of wood or plastic (solid or hollow) as disclosed herein and has sufficient strength to allow pushing or lifting of snow. The plow member 101 is typically made of a plastic or elastomeric material to maintain a low weight for the device and so that it is able to slide over the vehicle without causing scratches or other damage to painted or glass surfaces.

The device of the invention can also be made from a conventional five gallon pail which is cut in half. The actual dimensions of the device of this embodiment are: the handle member is 54" with a diameter of ⅞", and the plow member has a diameter of 10" and a length of 14". The handle attaches at the center or 10 degrees from the center of the half circle. In addition, the end portions of the plow member has ends splay at a small angle so that multiple plow members can be stacked for shipping. This configuration also assists in having the part eject easily from an injection mold.

FIG. 2 is an illustrative representation of snow removal device 100 hanging in storage. In each depiction, the handle member 102 is removed from the plow member body 101 of FIG. 1 and is then assembled in a more compact form as previously described. The left side depiction in FIG. 2 shows the plow member 101 sitting on a support rail 110 and with the handle member extending below the plow member. The support rail 110 can include a nail or hook that can engage the plow member to hold the device in position on the rail. On the right side of FIG. 2, the handle member 102 includes an opening 111 at the end to allow the handle member to be placed on a nail which passes through the opening 111 to hang the device from the nail. FIG. 3 is an illustrative representation of snow removal device in section to further illustrate where the handle member is attached to the threaded opening. This also shows that the opening is reinforced so that a strong connection to the handle member can be made.

Figure 5:
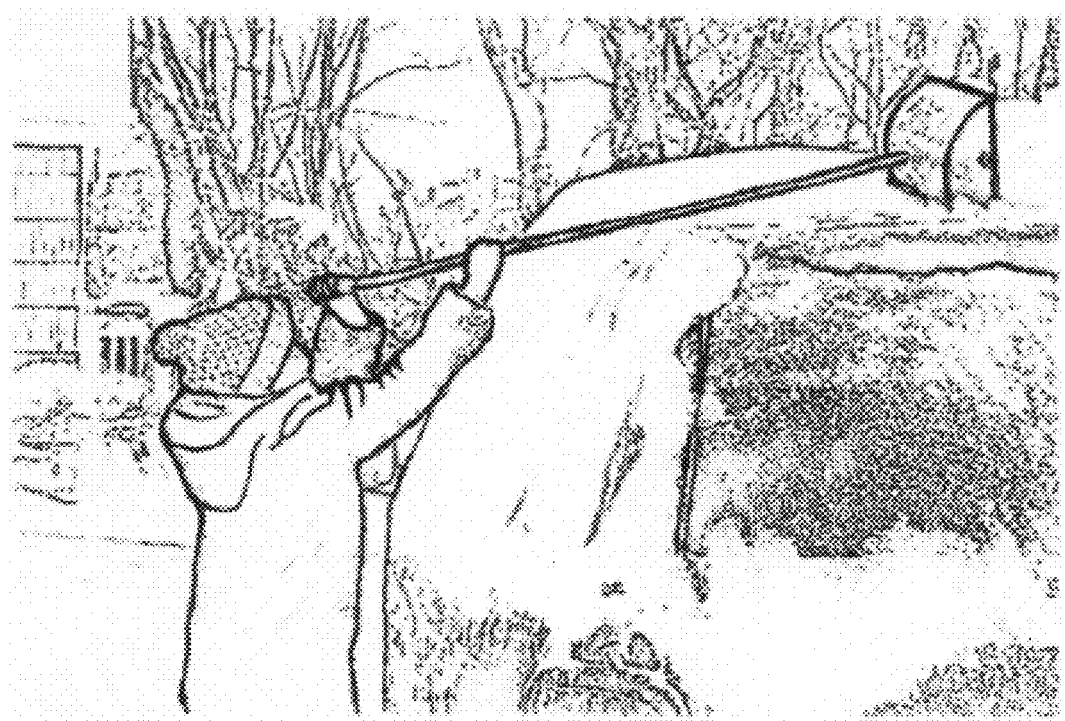
FIG. 5 is an illustrative representation of a snow removal from van or SUV roof.

FIG. 4 is an illustrative representation of the use of the device for snow removal from a vehicle. The user demonstrates the proper technique needed to push the device through the accumulated snow to safely remove it from the vehicle. FIG. 5 is an illustrative representation of snow removal from a van or SUV roof using the device over head to safely remove accumulated snow from the roof of the vehicle. In each of FIGS. 4 and 5, it is clearly shown that the user does not contact the snow on the vehicle as the handle member has a sufficient length to remove snow while maintaining the user at a safe, non-contact distance away from the vehicle.

The specific length of the handle member is selectable by the user depending upon the user's height and the size of the vehicle. The handle member can be provided in one of the longer lengths described herein and then be cut to size to conform to the requirements of the user and his or her vehicle. The device 100 can also have a telescopic handle member that is adjustable to provide a longer length when needed for larger vehicles. A typical telescopic handle member is disclosed in U.S. Pat. No. 5,694,695, the entire content of which is expressly incorporated herein by reference thereto for a better understanding of this feature. The telescopic handle member is locked in place when the handle member length is at the most desirable position for snow removal from the vehicle. This type of telescopic mechanism is well known for other tools, such as window washing poles which collapse to a manageable length when not in use but which can be extended to the desired length when used for cleaning.

Plow member 101 of FIG. 1 is configured as a shovel type head which contacts snow in order to push snow from vehicle and other surfaces. The rigid handle member 102 when assembled allows the user to push snow from a safe distance away from the snow on the vehicle so that the user does not have to physically come in contact with the snow. Using a pushing technique, as shown in FIGS. 4 and 5, the entire surface of vehicle hood, trunk, roof and windshield can be made clear of snow without the user having to contact the snow. Afterwards, the vehicle can be further cleaned, if necessary with scrapers or brooms making the vehicle safe for user, as well as to prevent remaining snow or ice from falling off the vehicle when driven so that it does not impact other vehicles being driven nearby.

The plow member 101 of FIG. 1 can be manufactured in any number of ways. It can be injection molded or formed in a press. It could also be 3D printed. As noted, the material of the plow member can be any sufficiently rigid plastic or elastomeric material that can securely hold a handle member and not fail under the stresses of the weight of snow when lifted or pushed. Handle member 102 can be made from any rigid material which is strong enough to securely hold the plow member and move snow without breaking. This would typically be a wood, plastic or lightweight metal and the handle member is secured to the plow member head to create the device. The handle member is frequently made separate from the plow member but they can be molded or otherwise joined or welded together as a single unit when the same materials for each component are used. As noted, certain welded or other more securely joined components do not allow for compact storage as does the handle member that is screwed into aperture 108 in the plow member. One advantage for manufacturing separate parts is that the unit will be easier to store when not in use and one of the components can be replaced if damaged or broken.

The handle member 102 can be of any basic shape. While a cylindrical rod is preferred, it can be made with an oval or polygonal cross section and can be in the form of a solid or hollow rod. The handle member can also be formed or otherwise provided with hand grips or a hand hold. The plow member can range in size and shape as noted above as long as the shape and dimensions are suitable for effectively moving snow. Preferably, the device can be scaled down and stored in the vehicle trunk or cab.

After snow has accumulated, the user would clear a path to their vehicle using standard methods. The user would then remove the handle member 102 and affix it to the plow member 101 to complete the assembly shown in FIG. 1. This is a quick and easy way to convert the device from the storage position to the operative configuration. In the latter configuration, the user can use the tool to push the snow off vehicle (see FIG. 4), either starting from one side of vehicle or the other side in an organized manner, or using a more random technique. In any case, all snow can be simply and easily removed from vehicle. The user can also gain access to vehicle's trunk and cab, to access other cleaning tools, or to operate vehicle after the snow is removed.

Additionally, the invention may be scaled down in size so that it can be stored inside the trunk or cab of the vehicle for use away from home. It can be collapsed as well for this purpose. It can be used to push crops or other materials in a more commercial or industrial setting.

The foregoing detailed description is considered as illustrative only of the principles of the invention. Further, since numerous modifications and changes will readily be apparent to those having ordinary skill in the art, it is not desired to limit the invention to the exact constructions and configurations demonstrated. Accordingly, all suitable modifications and equivalents may be resorted to while still falling within the scope of the appended claims.

What is claimed is:

1. A device for removing snow from an automobile vehicle comprising:
   a plow member having a sidewall, end portions forming with the sidewall an open unobstructed cavity having an approximately half-cylindrical configuration for contact with or removal of snow accumulated on the vehicle, with a first end portion including an opening therein, and wherein the sidewall is configured to form a rectangular opening for the cavity and the plow member is made of a resilient, durable plastic or elastomeric material;

a handle member that is securely connected to the plow member to allow manipulation of the plow member, the handle member having a length sufficient to contact and remove snow from the vehicle's roof, front window, hood and/or trunk without the user's hand or arm touching the snow on the vehicle;

a reinforced aperture in the plow member sidewall for receiving and connecting thereto an end of the handle member so that the plow member can be manipulated to allow the user to remove snow from the vehicle's roof, front window, hood and/or trunk without causing scratches or damage to glass or painted surfaces;

wherein the device can be stored after the snow is removed by withdrawing the handle member from the reinforced aperture of the plow member sidewall and attaching the handle member to the opening in the first end portion to form a collapsed device for storing on a support rail.

2. The device of claim 1 wherein the plow member has a length of about 6 to 24 inches or about 12 to 18 inches, wherein the handle member is a solid or hollow rod having a length of between 12 and 72 inches or about 36 to 60 inches.

3. The device of claim 2 wherein the handle member is telescopic so that it can be collapsed to a length that is less than the overall length.

4. The device of claim 1 wherein the handle member has a threaded end and the reinforced aperture includes internal threads for receiving the threaded end of the handle member and is located in the center of the sidewall so that approximately the same amount of sidewall extends above and below the first reinforced aperture.

5. The device of claim 1 wherein, when the handle member is attached to the opening in the first end portion after withdrawing the handle member from the reinforced aperture of the plow member sidewall, a collapsed device is formed for storing on a support rail.

6. The device of claim 1 wherein the plow member includes a second end portion that includes an opening that is larger than the handle member perimeter, and the device is returned to storage after the snow is removed by withdrawing the handle member from the reinforced aperture of the plow member sidewall; inserting the handle member into the opening of the second end portion and attaching the handle member to the opening in the first end portion to form a collapsed device; and storing the collapsed device on a support rail.

7. A device for removing snow from an automobile vehicle comprising:
a plow member having a sidewall, end portions forming with the sidewall an open cavity for contact with or removal of snow accumulated on the vehicle, with a first end portion including an opening therein and with the plow member made of a resilient, durable plastic or elastomeric material;
a handle member that is securely connected to the plow member to allow manipulation of the plow member, the handle member having a length sufficient to contact and remove snow from the vehicle's roof, front window, hood and/or trunk without the user's hand or arm touching the snow on the vehicle;
a first reinforced aperture in the plow member sidewall for receiving and connecting thereto an end of the handle member so that the plow member can be manipulated to allow the user to remove snow from the vehicle's roof, front window, hood and/or trunk without causing scratches or damage to glass or painted surfaces;
wherein the plow member has an approximately half cylindrical configuration, and wherein each end portion is a segment that has an approximately half-circle configuration and at least one of which includes an opening to receive the handle member therein.

8. The device of claim 7 wherein the handle member is removable from the reinforced aperture of the plow member and to then be received in the end portion opening for compact storage.

9. The device of claim 8, wherein the opening on one end portion of the plow member is larger than the circumference of the handle member while the opening on the other end portion of the plow member includes internal threads for receiving the threaded end of the handle member.

10. The device of claim 7 wherein the handle member is telescopic so that it can be collapsed to a length that is less than the overall length.

11. The device of claim 7 wherein the first reinforced aperture includes internal threads for receiving a threaded end of the handle member and is located in the center of the sidewall so that approximately the same amount of sidewall extends above and below the first reinforced aperture.

12. A method of removing snow from a vehicle which comprises:
providing a stored snow removal device comprising:
a plow member having a sidewall, end portions forming with the sidewall an open cavity for contact with or removal of snow accumulated on the vehicle, wherein a first end portion includes an opening to receive the handle member for storage of the device, and the plow member is made of a resilient, durable plastic or elastomeric material;
a handle member having an end that is capable of being securely connected to the plow member to allow manipulation of the plow member, the handle member having a length sufficient to contact and remove snow from the vehicle's roof, front window, hood and/or trunk without the user's hand or arm touching the snow on the vehicle; and
a reinforced aperture in the plow member sidewall for receiving and connecting thereto the end of the handle member so that the plow member can be manipulated to allow the user to remove snow from the vehicle's roof, front window, hood and/or trunk without causing scratches or damage to glass or painted surfaces;
wherein the stored snow removal device includes the handle member end received in the first end portion opening for storage;
retrieving the snow removal device from storage;
removing the end of the handle member from the first end portion opening and placing the end of the handle member into the reinforced aperture on the plow member sidewall for attachment thereto and to place the device in an operable position; and
removing snow from the vehicle while sliding the plow member over vehicle surfaces to remove accumulated snow therefrom without scratching the vehicle surfaces.

13. The method of claim 12 wherein the plow member opening, the end of the handle member and the reinforced aperture are each provided with threads and the device is returned to storage after the snow is removed by withdrawing the threaded handle member end from the threaded aperture of the plow member sidewall; and attaching the threaded handle member end to the threaded opening in the first end portion to form a collapsed device; and storing the collapsed device on a support rail.

14. The method of claim 12 wherein the plow member includes a second end portion that includes an opening that is larger than the handle member perimeter, and the device is returned to storage after the snow is removed by withdrawing the handle member from the reinforced aperture of the plow member sidewall; inserting the handle member into the opening of the second end portion and attaching the handle member to the opening in the first end portion to form a collapsed device; and storing the collapsed device on a support rail.

15. A method of removing snow from a vehicle which comprises:
   retrieving the device of claim 1 from storage;
   attaching an end of the handle member into the reinforced aperture on the plow member sidewall to place the device in an operable position; and
   removing snow from the vehicle while sliding the plow member over vehicle surfaces to remove accumulated snow therefrom without scratching or damaging vehicle surfaces.

16. The method of claim 15 wherein the device is returned to storage after the snow is removed by withdrawing the handle member from the aperture of the plow member sidewall; and storing the collapsed device on a support rail.

* * * * *